(12) United States Patent
Oda

(10) Patent No.: US 11,274,959 B2
(45) Date of Patent: Mar. 15, 2022

(54) WEIGHING APPARATUS AND COMBINATION WEIGHING APPARATUS

(71) Applicant: Ishida Co., Ltd., Kyoto (JP)

(72) Inventor: Kazuteru Oda, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 58 days.

(21) Appl. No.: 16/894,963

(22) Filed: Jun. 8, 2020

(65) Prior Publication Data

US 2020/0408587 A1 Dec. 31, 2020

(30) Foreign Application Priority Data

Jun. 25, 2019 (JP) .............................. JP2019-117691

(51) Int. Cl.
*G01G 19/393* (2006.01)
*G01G 3/14* (2006.01)
*G01G 23/00* (2006.01)

(52) U.S. Cl.
CPC .............. *G01G 19/393* (2013.01); *G01G 3/14* (2013.01); *G01G 23/005* (2013.01)

(58) Field of Classification Search
CPC ....... G01G 3/14; G01G 19/387; G01G 19/393; G01G 23/005
See application file for complete search history.

(56) References Cited

U.S. PATENT DOCUMENTS

| | | | |
|---|---|---|---|
| 9,417,117 B2 * | 8/2016 | Kishikawa | ........... G01G 23/005 |
| 2016/0169732 A1 | 6/2016 | Kishikawa et al. | |

FOREIGN PATENT DOCUMENTS

| | | |
|---|---|---|
| CN | 1782678 A | 6/2006 |
| CN | 203349919 U | 12/2013 |
| CN | 104303029 A | 1/2015 |
| CN | 205808532 U | 12/2016 |
| GB | 2496545 A | 5/2013 |
| JP | 2013250196 A | 12/2013 |

OTHER PUBLICATIONS

The extended European search report issued by the European Patent Office dated Oct. 13, 2020, which corresponds to European Patent Application No. 20178292.7-1001 and is related to U.S. Appl. No. 16/894,963.

* cited by examiner

*Primary Examiner* — Randy W Gibson
(74) *Attorney, Agent, or Firm* — Studebaker & Brackett PC

(57) ABSTRACT

A weighing apparatus includes a load cell, a fixing portion to which one end of the load cell is fixed, a hopper configured to store articles, a connecting portion configured to connect the other end of the load cell and the hopper to each other, a first support portion facing a first portion provided to the load cell or the connecting portion via a first gap and configured to support the first portion along a first direction when a first limit load acts on the hopper, and a second support portion facing a second portion provided to the load cell or the connecting portion via a second gap and configured to support the second portion along a second direction intersecting the first direction while the first support portion supports the first portion when a second limit load larger than the first limit load acts on the hopper.

4 Claims, 7 Drawing Sheets

WEIGHING APPARATUS AND COMBINATION WEIGHING APPARATUS

TECHNICAL FIELD

The present disclosure relates to a weighing apparatus and a combination weighing apparatus.

BACKGROUND

Japanese Unexamined Patent Publication No. 2013-250196 describes a weighing apparatus using a load cell and including a fixing member for fixing one end of the load cell, a weighing hopper on which an object to be weighed is placed, a connecting member for connecting the weighing hopper and a free end of the load cell, and an overload protection mechanism for protecting the load cell from overload. In the weighing apparatus described in Japanese Unexamined Patent Publication No. 2013-250196, the overload protection mechanism operates as follows. That is, when a first limit load acts on the load cell, a first support portion supports a first portion set for either the load cell or the connecting member from below. Further, when a second limit load larger than the first limit load acts on the load cell, at the same time as the first support portion supports the first portion, a second support portion supports a second portion set for either the connecting member or the load cell from above.

SUMMARY

However, in the weighing apparatus described in Japanese Unexamined Patent Publication No. 2013-250196, since the overload protection mechanism is configured such that the first support portion supports the first portion from below and the second support portion supports the second portion from above, when the first support portion supports the first portion, a gap between the second support portion and the second portion widens. For this reason, in the weighing apparatus described in Japanese Unexamined Patent Publication No. 2013-250196, the second limit load increases, and there is concern that the second limit load may become unstable.

An object of the present disclosure is to provide a weighing apparatus and a combination weighing apparatus capable of suppressing an increase in the second limit load and preventing the second limit load from becoming unstable when the first limit load for protecting the load cell from an overload and the second limit load larger than the first limit load are set.

A weighing apparatus of an aspect of the present disclosure includes a load cell, a fixing portion to which one end of the load cell is fixed, a hopper configured to store articles, a connecting portion configured to connect the other end of the load cell and the hopper to each other, a first support portion facing a first portion provided to the load cell or the connecting portion via a first gap and configured to support the first portion along a first direction when a first limit load acts on the hopper, and a second support portion facing a second portion provided to the load cell or the connecting portion via a second gap and configured to support the second portion along a second direction intersecting the first direction while the first support portion supports the first portion when a second limit load larger than the first limit load acts on the hopper.

In this weighing apparatus, when the first limit load acts on the hopper, the first support portion supports the first portion along the first direction. Further, when the second limit load larger than the first limit load acts on the hopper, the second support portion supports the second portion along the second direction intersecting the first direction while the first support portion supports the first portion. In this way, even when the first support portion is in a state of supporting the first portion, a second gap between the second support portion and the second portion is difficult to widen. Therefore, according to this weighing apparatus, when the first limit load for protecting the load cell from an overload and the second limit load larger than the first limit load are set, it is possible to suppress the second limit load from increasing, and it is possible to prevent the second limit load from becoming unstable.

In the weighing apparatus of the aspect of the present disclosure, the first direction may be a vertical direction, the second direction may be a direction in which the one end of the load cell and the other end of the load cell face each other, the first support portion may be provided to a first extending portion configured to extend from the fixing portion to a side of the load cell, and the second support portion may be provided to a second extending portion configured to extend above the load cell from the fixing portion. In this way, an overload protection mechanism that protects the load cell from an overload by a two-stage limit load can be configured compactly.

In the weighing apparatus of the aspect of the present disclosure, the first portion may be provided to the connecting portion to face the first support portion from above in the first direction, and the second portion may be provided to the connecting portion to face the second support portion from an opposite side from the hopper in the second direction. In this way, an overload protection mechanism that protects the load cell from an overload by a two-stage limit load can be configured further compactly.

A combination weighing apparatus of an aspect of the present disclosure is a combination weighing apparatus including a plurality of weighing apparatuses described above, a conveyance portion configured to convey the articles to the hopper, and a controller configured to select a combination of weighing values so that a total value becomes a target weighing value based on weighing values of the articles output from the weighing apparatuses, and discharge the articles to the hopper corresponding to the combination.

This combination weighing apparatus includes the plurality of weighing apparatuses described above. Therefore, according to this combination weighing apparatus, when the first limit load for protecting the load cell from an overload and the second limit load larger than the first limit load are set in each of the plurality of weighing apparatuses, it is possible to suppress the second limit load from increasing, and it is possible to prevent the second limit load from becoming unstable.

DETAILED DESCRIPTION

Hereinafter, an embodiment of the disclosure will be described in detail with reference to drawings. Incidentally, in each figure, the same or a corresponding part is denoted by the same reference symbol, and duplicate description is omitted.

Configuration of Combination Weighing Apparatus

Figure 1:
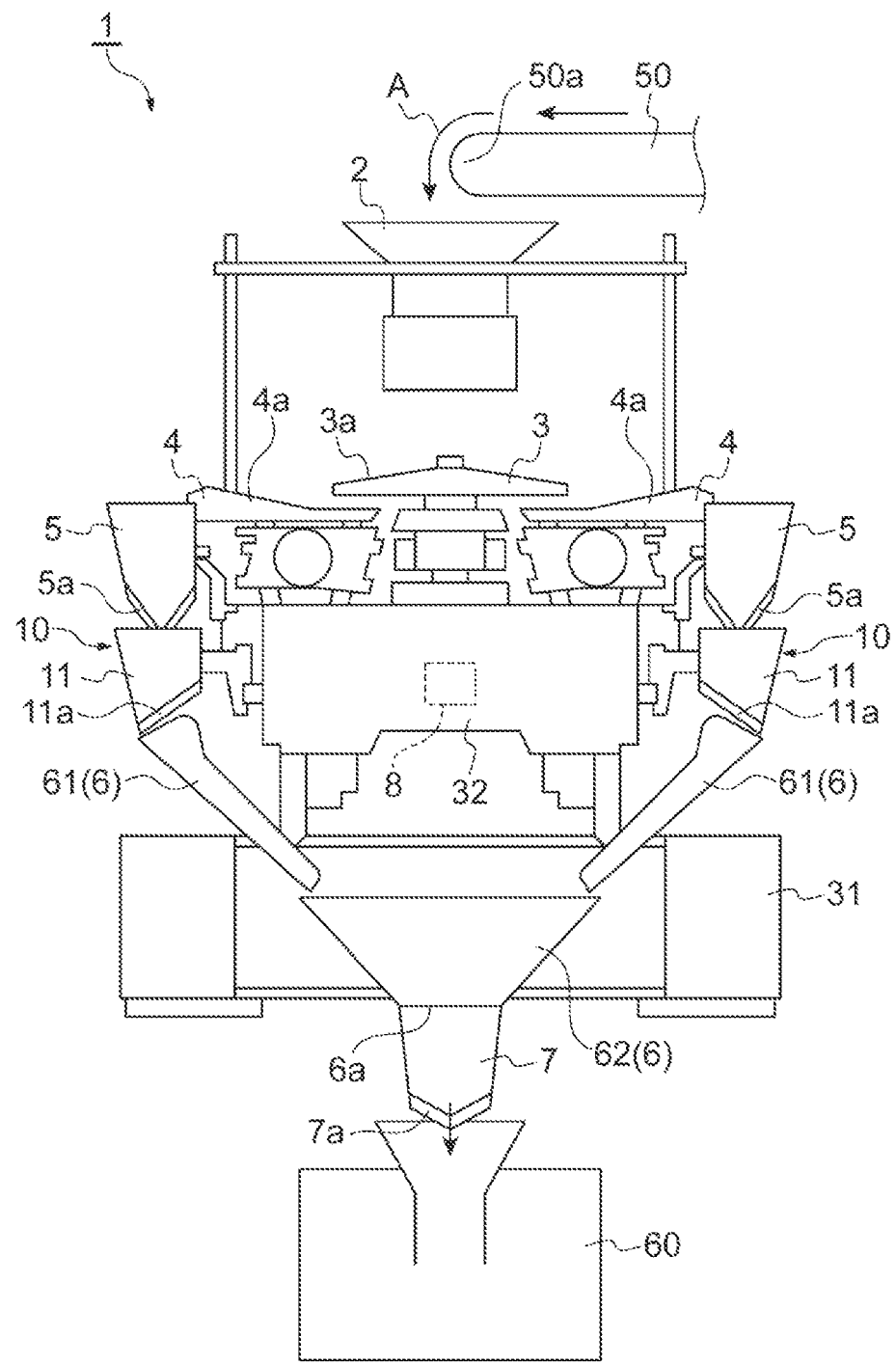
FIG. 1 is a configuration diagram of a combination weighing apparatus according to an embodiment.

As illustrated in FIG. 1, a combination weighing apparatus 1 includes an charge chute 2, a dispersion feeder (conveyance portion) 3, a plurality of radiation feeders (conveyance portion) 4, a plurality of pool hoppers 5, a plurality of weighing apparatuses 10, each of which has a weighing hopper (hopper) 11, a collecting chute 6, a timing hopper 7, and a controller 8. The combination weighing apparatus 1 weighs articles A (articles having variations in unit mass such as agricultural products, fishery products, and processed foods) supplied by a conveyance conveyor 50 such that the articles A correspond to a target weighing value, and supplies the articles A to a bag making/packaging machine 60. Incidentally, the bag making/packaging machine 60 is a device that packages the articles A weighed and supplied by the combination weighing apparatus 1 while molding a film into a bag of a predetermined capacity.

The charge chute 2 is disposed below a conveying end 50a of the conveyance conveyor 50. The charge chute 2 receives the articles A conveyed from the outside by the conveyance conveyor 50 and dropped from the conveying end 50a of the conveyance conveyor 50, and discharges the articles A downward.

The dispersion feeder 3 is disposed below the charge chute 2. The dispersion feeder 3 has a conical conveying surface 3a that widens downward toward an end. The dispersion feeder 3 vibrates the conveying surface 3a to uniformly convey the articles A discharged from the charge chute 2 to a top of the conveying surface 3a toward an outer edge of the conveying surface 3a.

The plurality of radiation feeders 4 is radially arranged along the outer edge of the conveying surface 3a of the dispersion feeder 3. Each of the radiation feeders 4 has a trough 4a extending outward from below the outer edge of the conveying surface 3a. Each radiation feeder 4 conveys the articles A discharged from the outer edge of the conveying surface 3a toward a distal end of the trough 4a by vibrating the trough 4a.

The plurality of pool hoppers 5 is annularly disposed such that each of the pool hoppers 5 is located below the distal end of the trough 4a of each radiation feeder 4. Each pool hopper 5 has a gate 5a allowed to be opened and closed with respect to a bottom thereof. Each pool hopper 5 temporarily stores the articles A discharged from the distal end of the corresponding trough 4a by closing the gate 5a, and discharges the temporarily stored articles A downward by opening the gate 5a.

The plurality of weighing hoppers 11 is annularly disposed such that each of the weighing hoppers 11 is located below the gate 5a of each pool hopper 5. Each weighing hopper 11 has a gate 11a allowed to be opened and closed with respect to a bottom thereof. Each weighing hopper 11 temporarily stores the articles A discharged from the corresponding pool hopper 5 by closing the gate 11a, and discharges the temporarily stored articles A downward by opening the gate 11a. Each of the weighing apparatus 10 weighs a weighing value according to the mass of the articles A when the weighing hopper 11 of the weighing apparatus 10 temporarily stores the articles A.

The collecting chute 6 includes a plurality of upper stage chute portions 61 and a lower stage chute portion 62. The plurality of upper stage chute portions 61 is annularly disposed such that an upper end of each upper stage chute portion 61 is located below the gate 11a of each weighing hopper 11 and lower ends of the respective upper stage chute portions 61 are gathered at a center. Each upper stage chute portion 61 receives the articles A discharged from each weighing hopper 11 and slides the articles A toward a central portion. The lower stage chute portion 62 is disposed below the lower end of each upper stage chute portion 61. The lower stage chute portion 62 discharges the articles A discharged from each upper stage chute portion 61 downward from a discharge port 6a.

The timing hopper 7 is disposed below the discharge port 6a of the collecting chute 6. The timing hopper 7 has a gate 7a allowed to be opened and closed with respect to a bottom thereof. The timing hopper 7 temporarily stores the articles A discharged from the collecting chute 6 by closing the gate 7a, and discharges the temporarily stored articles A to the bag making/packaging machine 60 by opening the gate 7a.

The controller 8 is disposed in a case 32 supported on a frame 31. The controller 8 includes a CPU, a ROM, a RAM, etc. The controller 8 controls an operation of each unit of the combination weighing apparatus 1 such as a conveying operation of the dispersion feeder 3 and the radiation feeder 4, an opening/closing operation of the gate 5a of each pool hopper 5, an opening/closing operation of the gate 11a of each weighing hopper 11, and an opening/closing operation of the gate 7a of the timing hopper 7. The controller 8 selects a combination of weighing values and causes the weighing hopper 11 corresponding to the combination to discharge the articles so that a total value becomes a target weighing value (specifically, so that the total value falls within a predetermined range having the target weighing value as a lower limit) based on weighing values of the articles A output from the respective weighing apparatuses 10 (that is, weighing values of the articles A temporarily stored by the weighing hoppers 11 of the respective weighing apparatuses 10).

In the combination weighing apparatus 1, the charge chute 2, the dispersion feeder 3, the plurality of radiation feeders 4, the plurality of pool hoppers 5 and the plurality of weighing apparatuses 10 are directly or indirectly supported by the case 32. The collecting chute 6 and the timing hopper 7 are directly or indirectly supported on the frame 31.

Configuration of Weighing Apparatus

Figure 2:
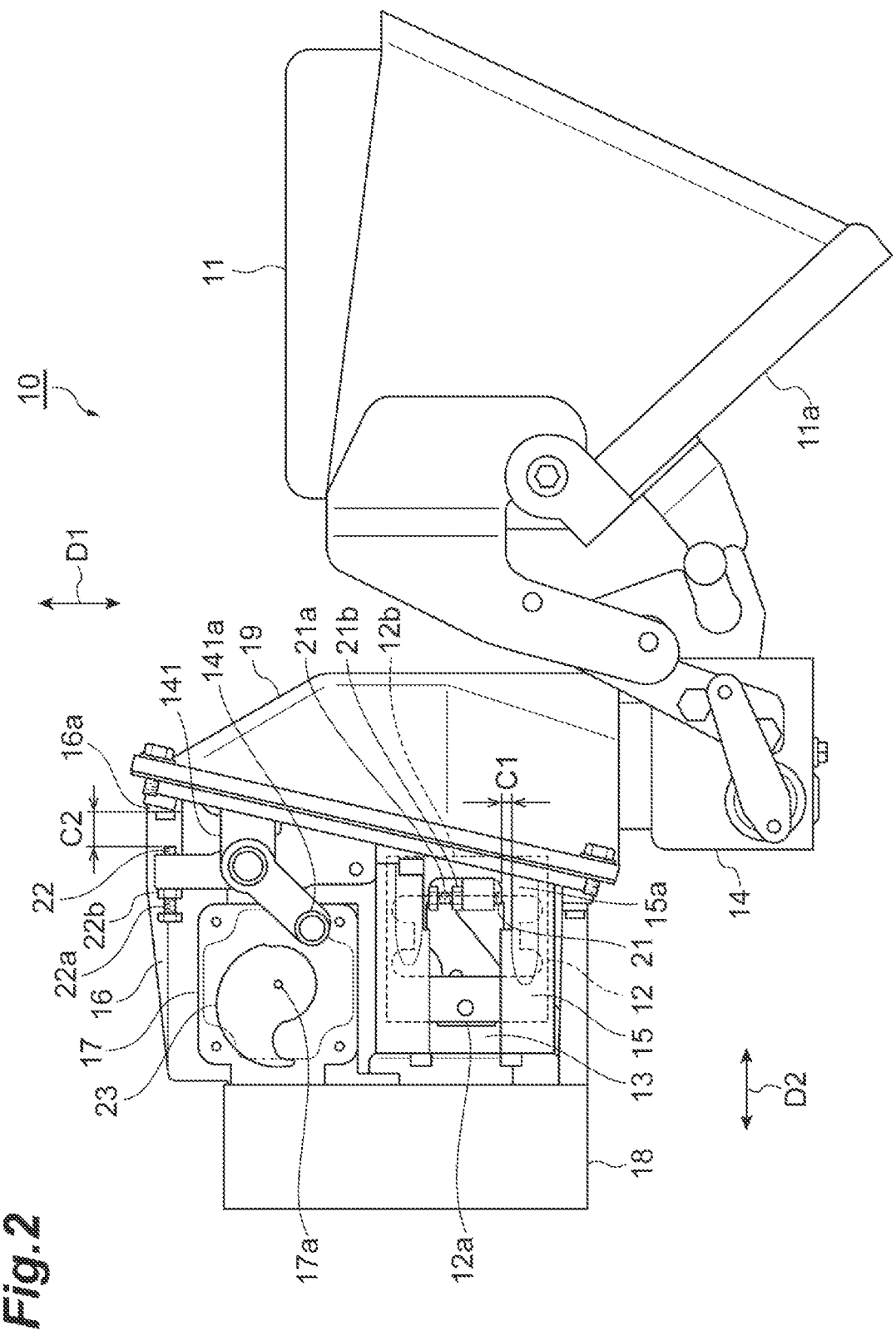
FIG. 2 is a side view of a weighing apparatus according to the embodiment.

As illustrated in FIG. 2, in addition to the weighing hopper 11, the weighing apparatus 10 includes a load cell 12, a fixing portion 13, a connecting portion 14, a first extending portion 15, a second extending portion 16, a driving motor 17, a control circuit 18. In the following description, a vertical direction is referred to as a first direction D1, and a direction in which a fixed end (one end) 12a of the load cell 12 and a free end (other end) 12b of the load cell 12 face each other is referred to as a second direction D2. In the present embodiment, the second direction D2 is a horizontal direction and is orthogonal to the first direction D1.

The fixed end 12a of the load cell 12 is fixed to the fixing portion 13 by, for example, a bolt. In the present embodiment, the load cell 12 is a strain gauge type load cell. The fixing portion 13 is fixed to the case 32 (see FIG. 1) by, for example, a bolt, etc.

The connecting portion 14 connects the free end 12b of the load cell 12 and the weighing hopper 11 to each other. The connecting portion 14 has a link mechanism 141 for opening and closing the gate 11a of the weighing hopper 11. Most of the link mechanism 141 is covered by a cover 19. The cover 19 is fixed to the fixing portion 13 side (specifically, the first extending portion 15 and the second extending portion 16) by, for example, a bolt, etc. The connecting portion 14 is in a state of being floating with respect to the cover 19. That is, the weighing hopper 11 and the connecting portion 14 are supported only by the load cell 12.

The pool hopper 5 (see FIG. 1) can be attached to the cover 19 via a bracket (not illustrated). The gate 5a of the pool hopper 5 is opened and closed via the driving motor (not illustrated) fixed to the fixing portion 13 side and the link mechanism (not illustrated).

The first extending portion 15 extends from the fixing portion 13 to a side of the load cell 12 (one side of the load cell 12 in a direction perpendicular to the first direction and the second direction). The first extending portion 15 is fixed to the fixing portion 13 by, for example, a bolt, etc. The first extending portion 15 is provided with a first support portion 15a. In the present embodiment, the first support portion 15a is a part of the first extending portion 15. The first support portion 15a faces a first portion 21 provided on the connecting portion 14 via a first gap C1. When a first limit load M1 (see FIG. 4) acts on the weighing hopper 11, the first support portion 15a supports the first portion 21 along the first direction D1. The first limit load M1 is a downward load, and is a first-stage limit load for protecting the load cell 12 from an overload.

In the present embodiment, the first portion 21 faces the first support portion 15a from above in the first direction D1. As an example, the first portion 21 is a tip of a downward bolt 21a. The bolt 21a is screwed to a portion of the connecting portion 14 whose position with respect to the free end 12b of the load cell 12 is fixed (for example, a portion other than the link mechanism 141) while penetrating the portion, and a position with respect to the portion is fixed by a fixing nut 21b. By this configuration, the first gap C1 between the first support portion 15a and the first portion 21 can be finely adjusted.

The second extending portion 16 extends from the fixing portion 13 above the load cell 12. The second extending portion 16 is fixed to the fixing portion 13 by, for example, a bolt. The second extending portion 16 is provided with a second support portion 16a. In the present embodiment, the second support portion 16a is a part of the second extending portion 16. The second support portion 16a faces a second portion 22 provided on the connecting portion 14 via a second gap C2. When a second limit load M2 (see FIG. 5) acts on the weighing hopper 11, the second support portion 16a supports the second portion 22 along the second direction D2 while the first support portion 15a supports the first portion 21. The second limit load M2 is a downward load larger than the first limit load M1, and is a second-stage limit load for protecting the load cell 12 from an overload.

In the present embodiment, the second portion 22 faces the second support portion 16a from the inside (opposite side from the weighing hopper 11) in the second direction D2. As an example, the second portion 22 is a tip of an outward bolt 22a. The bolt 22a is screwed to a portion of the connecting portion 14 whose position with respect to the free end 12b of the load cell 12 is fixed (for example, a portion other than the link mechanism 141) while penetrating the portion, and a position with respect to the portion is fixed by a fixing nut 22b. By this configuration, the second gap C2 between the second support portion 16a and the second portion 22 can be finely adjusted.

The driving motor 17 is fixed to the fixing portion 13 side (specifically, the second extending portion 16) by, for example, a bolt, etc. A cam 23 is fixed to a rotation shaft 17a of the driving motor 17. In the weighing apparatus 10, the gate 11a of the weighing hopper 11 is opened and closed by cooperation of the cam 23 and a cam follower 141a of the link mechanism 141. In a state where the gate 11a is closed (that is, in a state where the articles A can be stored in the weighing hopper 11 and the articles A can be weighed in the weighing hopper 11), the cam 23 is separated from the cam follower 141a, and thus the weighing hopper 11 and the connecting portion 14 are supported only by the load cell 12.

The control circuit 18 is fixed to the fixing portion 13 side (specifically, the first extending portion 15 and the second extending portion 16) by, for example, a bolt, etc. The control circuit 18 is electrically connected to each of the load cell 12, the driving motor 17, and the controller 8 (see FIG. 1). The control circuit 18 outputs weighing values of the articles A output from the load cell 12 (that is, weighing values of the articles A temporarily stored by the weighing hopper 11) to the controller 8. The control circuit 18 controls the operation of the driving motor 17 based on an instruction to open and close the gate 11a output from the controller 8.

Action and Effect

Figure 3:
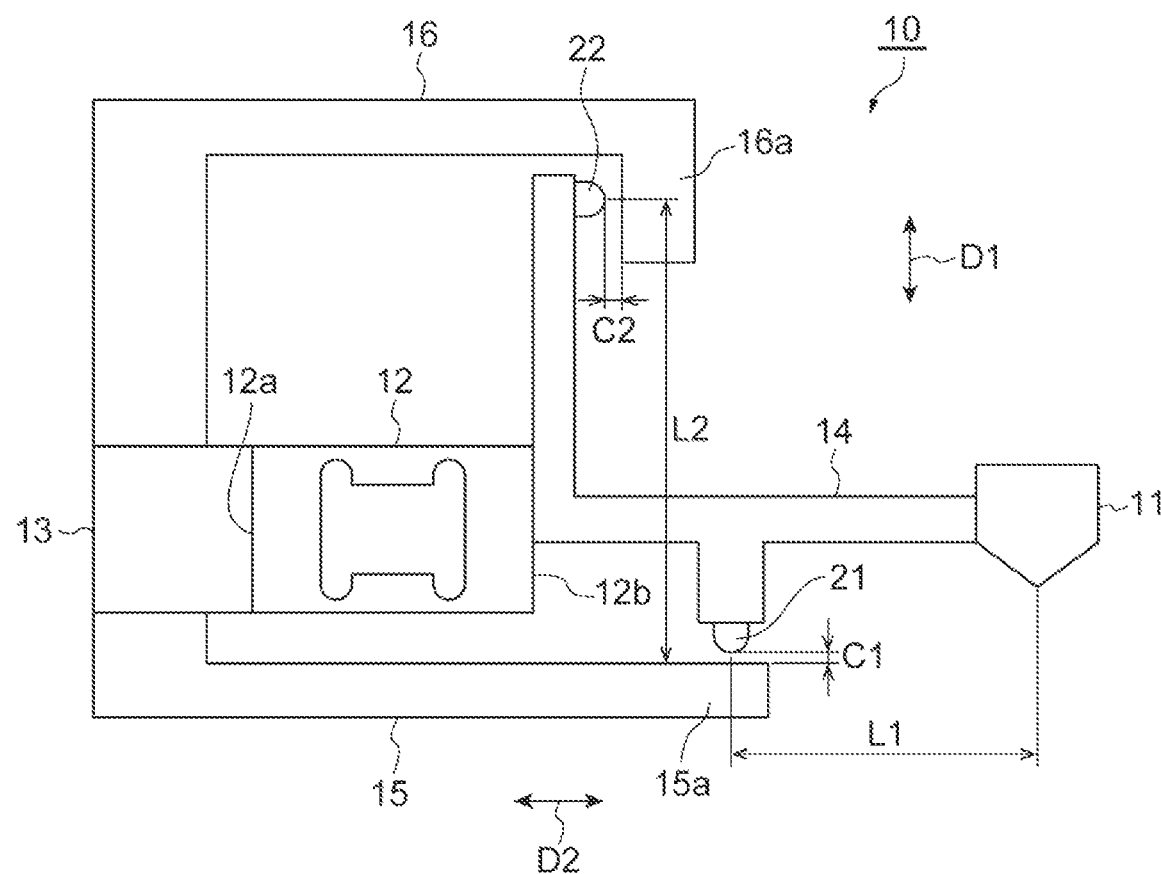
FIG. 3 is a schematic diagram of the weighing apparatus illustrated in FIG. 2.
Figure 4:
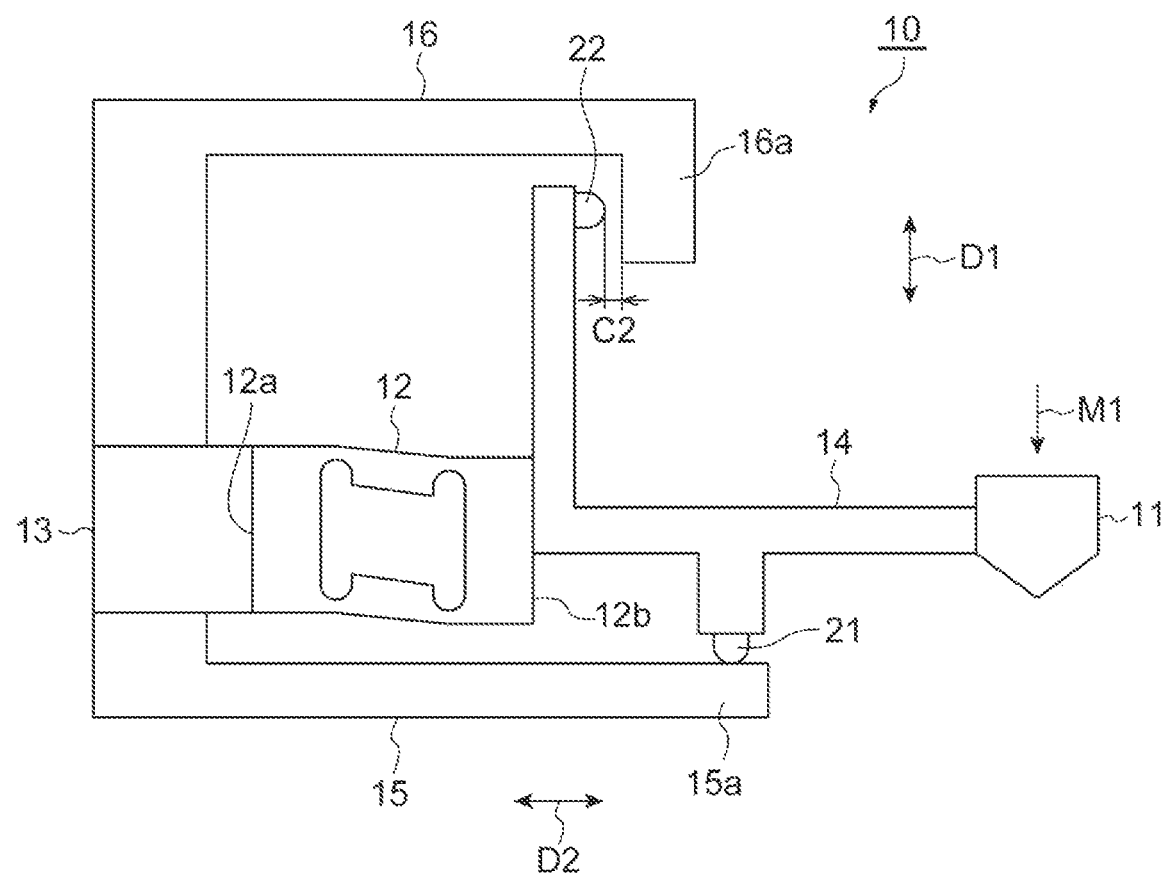
FIG. 4 is a schematic diagram of the weighing apparatus illustrated in FIG. 2.
Figure 5:
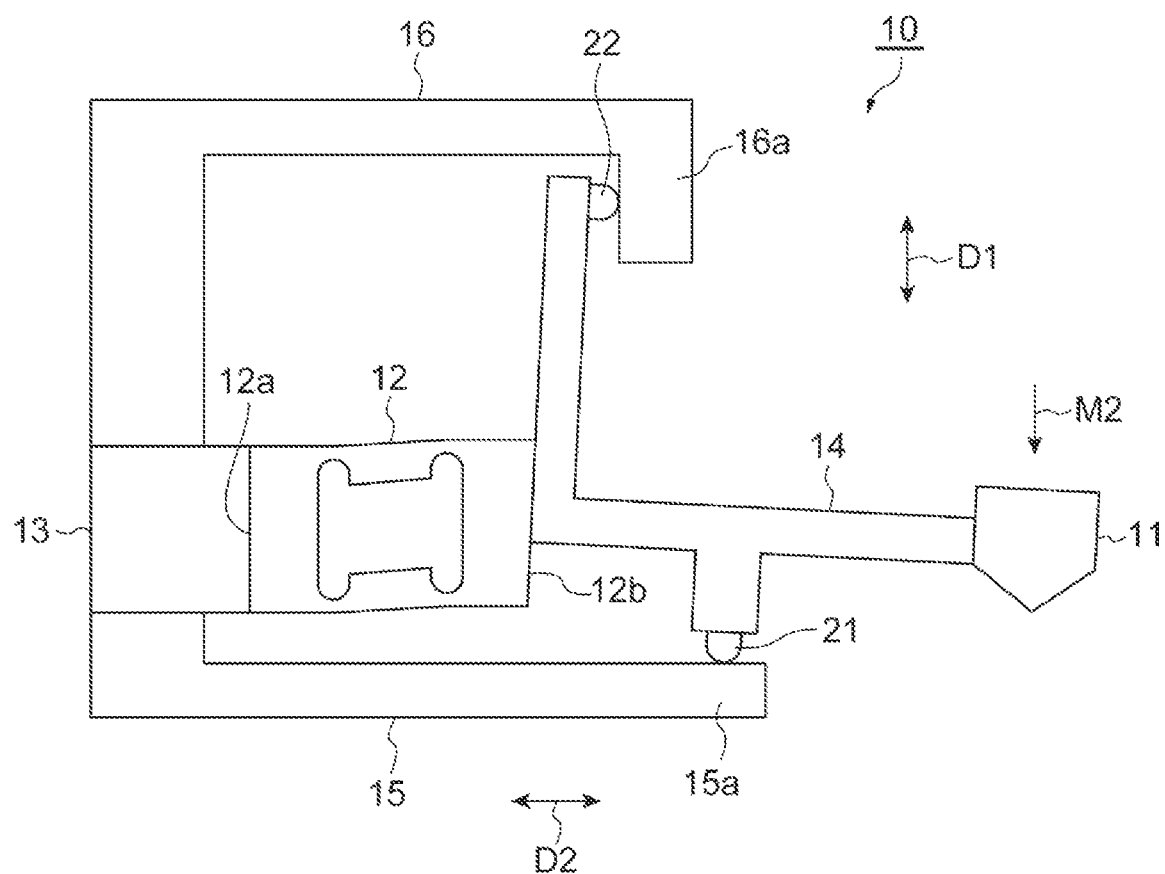
FIG. 5 is a schematic diagram of the weighing apparatus illustrated in FIG. 2.

In the weighing apparatus 10, as illustrated in FIG. 3, when the weighing hopper 11 is in an unloaded state, the first support portion 15a faces the first portion 21 provided to the connecting portion 14 via the first gap C1, and the second support portion 16a faces the second portion 22 provided to the connecting portion 14 via the second gap C2. From this state, as illustrated in FIG. 4, when the first limit load M1 acts on the weighing hopper 11, the load cell 12 is deformed so that the first portion 21 comes into contact with the first support portion 15a, and the first support portion 15a supports the first portion 21 along the first direction D1. From this state, as illustrated in FIG. 5, when the second limit load M2 acts on the weighing hopper 11, while the first support portion 15a supports the first portion 21, the load cell 12 is deformed by the moment with the first support portion 15a as a fulcrum, so that the second portion 22 comes into contact with the second support portion 16a, and the second support portion 16a supports the second portion 22 along the second direction D2. Here, since the second direction D2 is a direction intersecting the first direction D1 (in the present embodiment, a direction orthogonal to the first direction D1), even when the first support portion 15a is in a state of supporting the first portion 21 as illustrated in FIG. 4, the second gap C2 between the second support portion 16a and the second portion 22 is difficult to widen. Therefore, according to the weighing apparatus 10 (and the combination weighing apparatus 1 including a plurality thereof), when the first limit load M1 for protecting the load cell 12 from an overload and the second limit load M2 larger than the first limit load M1 are set, it is possible to prevent the second limit load M2 from increasing and to prevent the second limit load M2 from becoming unstable. Incidentally, FIG. 3, FIG. 4, and FIG. 5 are schematic views of the weighing apparatus illustrated in FIG. 2.

Figure 6:
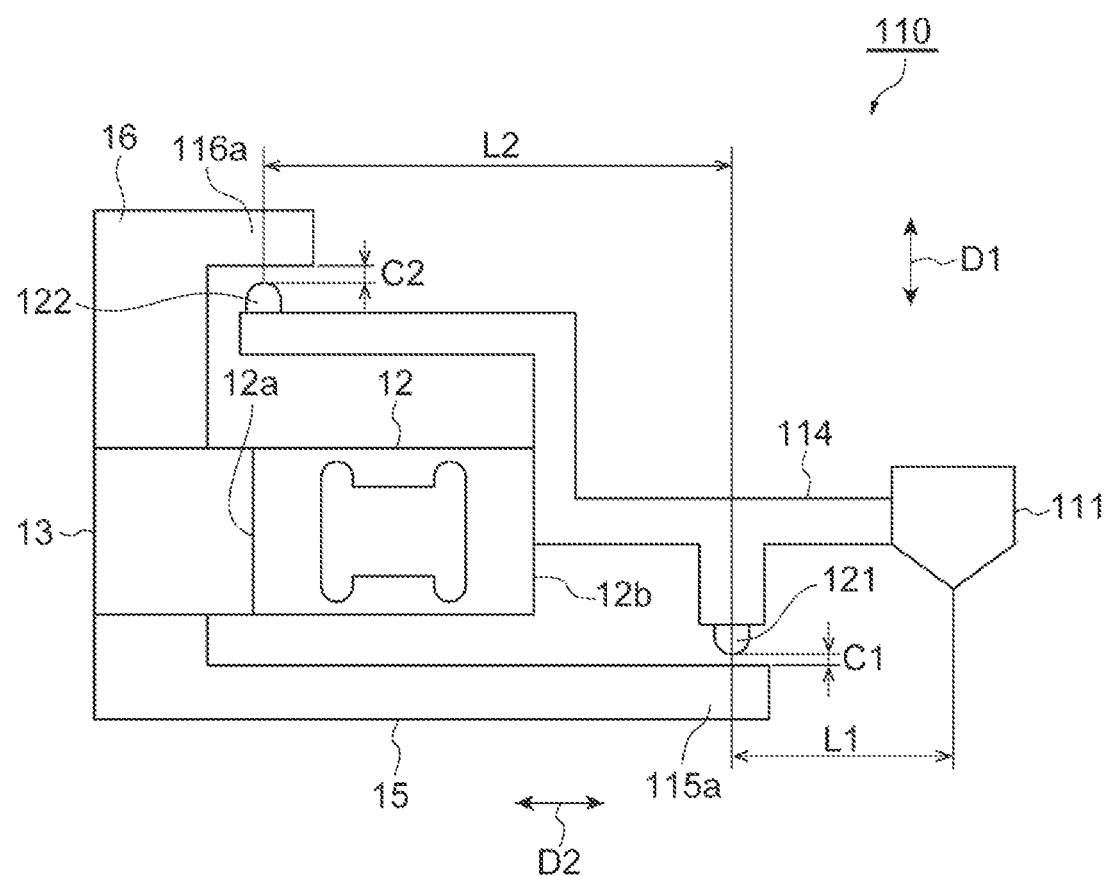
FIG. 6 is a schematic diagram of a weighing apparatus of a comparative example.

The action and effect of the weighing apparatus 10 will be described in more detail. In a weighing apparatus 110 of a comparative example illustrated in FIG. 6, an overload protection mechanism operates as follows. That is, when a first limit load acts on a weighing hopper 111, a first support portion 115a supports a first portion 121 provided to a connecting portion 114 from below. Then, when the second limit load, which is larger than the first limit load, acts on the weighing hopper 111, a second support portion 116a supports a second portion 122 provided to the connecting portion 114 from above while the first support portion 115a supports the first portion 121. In this way, in the weighing apparatus 110 of the comparative example, when the first support portion 115a supports the first portion 121, a gap between the second support portion 116a and the second portion 122 widens to C1+C2. For this reason, there is concern that the second limit load M2 may increase, and the second limit load M2 may become unstable.

In the weighing apparatus 110 of the comparative example, in order to sufficiently ensure a change rate of a gap between the second support portion 116a and the second portion 122 when the moment with the first support portion 115a as a fulcrum is generated, a distance L1 (distance between the first support portion 115a and the weighing hopper 111 in a second direction D2) needs to be shortened with respect to a distance L2 (distance between the first support portion 115a and the second support portion 116a in the second direction D2). For this reason, an opening for finely adjusting the gap between the first support portion 115a and the first portion 121, and a lid for covering the opening need to be provided in the cover 19 illustrated in FIG. 2. As a result, there is concern that cleanability may be affected. Furthermore, since it is necessary to make the distance L2 longer than the distance L1, there is concern that the number of parts of the connecting portion 114 where the second portion 122 is provided may increase, or the gap between the second support portion 116a and the second portion 122 may increase.

On the other hand, in the weighing apparatus 10, since the overload protection mechanism operates as illustrated in FIG. 3, FIG. 4, and FIG. 5 as described above, the second limit load M2 of the weighing apparatus 10 is C2/(C1+C2) times the second limit load M2 of the weighing apparatus 110 of the comparative example. Therefore, according to the weighing apparatus 10, when the first limit load M1 for protecting the load cell 12 from an overload and the second limit load M2 larger than the first limit load M1 are set, it is possible to suppress an increase in the second limit load M2 and to prevent the second limit load M2 from becoming unstable.

Since it is unnecessary to shorten the distance L1 (distance between the first support portion 115a and the weighing hopper 11 in the second direction D2) with respect to the distance L2 (distance between the first support portion 115a and the second support portion 16a in the second direction D2) as illustrated in FIG. 3, the first support portion 15a and the first portion 21 can be brought closer to the load cell 12 side. In this way, fine adjustment of the gap between the first support portion 15a and the first portion 21 can be performed on the case 32 (see FIG. 1) side, and it is unnecessary to provide the cover 19 (see FIG. 2) with an opening for finely adjusting the gap between the first support portion 15a and the first portion 21 and a lid for covering the opening. Further, since it is unnecessary to increase the distance L2 with respect to the distance L1 in order to reduce the second limit load M2, it is possible to suppress an increase in the number of parts of the connecting portion 14 in which the second portion 22 is provided, and a variation in the gap between the second support portion 16a and the second portion 22.

In the weighing apparatus 10, the first support portion 15a is provided to the first extending portion 15 that extends from the fixing portion 13 to a side of the load cell 12, and the second support portion 16a is provided to the second extending portion 16 that extends above the load cell 12 from the fixing portion 13. In this way, the overload protection mechanism that protects the load cell front an overload by the two-stage limit load can be configured compactly.

In the weighing apparatus 10, the first portion 21 is provided to the connecting portion 14 to face the first support portion 15a from above in the first direction D1, and the second portion 22 is provided to the connecting portion 14 to face the second support portion 16a from an opposite side from the weighing hopper 11 in the second direction D2. In this way, the overload protection mechanism that protects the load cell from an overload by the two-stage limit load can be configured compactly.

Modification

Figure 7:
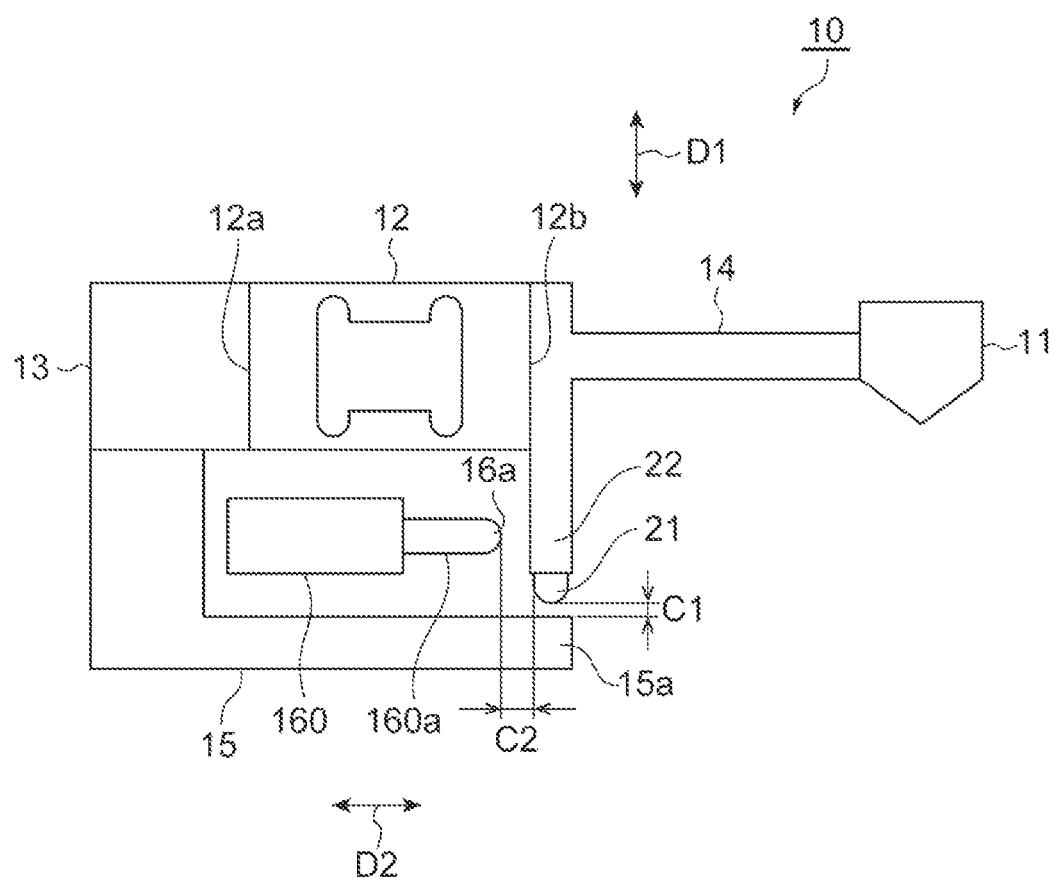
FIG. 7 is a schematic diagram of a weighing apparatus of a modification.

The present disclosure is not limited to the above embodiment. For example, as illustrated in FIG. 7, the second support portion 16a may include an actuator 160 that linearly moves along the second direction D2. In the weighing apparatus 10 illustrated in FIG. 7, the second support portion 16a faces the second portion 22 provided to the connecting portion 14 in a region below the load cell 12 from an opposite side from the weighing hopper 11 in the second direction D2.

As an example, in the weighing apparatus 10 illustrated in FIG. 7, the overload protection mechanism operates as follows. That is, when the first limit load acts on the weighing hopper 11, the first support portion 15a supports the first portion 21 along the first direction D1. The control circuit 18 (see FIG. 2) operates the actuator 160 so that when a weighing value output from the load cell 12 reaches a predetermined value M1' less than the first limit load, a gap between the second support portion 16a (specifically, a tip of a linear motion shaft 160a of the actuator 160) and the second portion 22 becomes a set value. In this case, the weighing apparatus 10 is prepared when the second limit load larger than the first limit load acts on the weighing hopper 11. Then, the control circuit 18 operates the actuator 160 so that when the weighing value output from the load cell 12 becomes less than the predetermined value M1', the tip of the linear motion shaft 160a of the actuator 160 returns to an initial position. Incidentally, a toggle mechanism, etc. may be applied to the second support portion 16a in preparation for a case where a limit load larger than the second limit load acts on the weighing hopper 11.

The first direction D1 may not completely coincide with the vertical direction and may be inclined with respect to the vertical direction. The second direction D2 may not completely coincide with the direction in which the fixed end 12a of the load cell 12 and the free end 12b of the load cell 12 face each other, and may be inclined with respect to the direction. In the above embodiment, the second direction D2 is orthogonal to the first direction D1. However, it is sufficient that the second direction D2 intersects the first direction D1. As an example, the second direction D2 may intersect the first direction D1 at an angle of 30 degrees or more (more preferably at an angle of 60 degrees or more).

The first portion 21 may be provided to the load cell 12. The second portion 22 may be provided to the load cell 12. The first extending portion 15 may be integrally formed with the fixing portion 13. The first support portion 15a may be provided in a portion other than the first extending portion 15. The second extending portion 16 may be integrally formed with the fixing portion 13. The second support portion 16a may be provided in a portion other than the second extending portion 16.

In the combination weighing apparatus 1, the conveyance portion that conveys the articles A to the weighing hopper 11 is not limited to the dispersion feeder 3 and the plurality of radiation feeders 4, and may have another configuration. The combination weighing apparatus 1 may be configured by disposing the plurality of weighing hoppers 11 in a matrix.

According to the present disclosure, when a first limit load for protecting a load cell from an overload and a second limit load larger than the first limit load are set, it is possible to provide a weighing apparatus and a combination weighing apparatus capable of suppressing an increase in the first limit load and preventing the second limit load from becoming unstable.

What is claimed is:

1. A weighing apparatus comprising:
a load cell;
a fixing portion to which one end of the load cell is fixed;
a hopper configured to store articles;
a connecting portion configured to connect the other end of the load cell and the hopper to each other;
a first support portion facing a first portion provided to the load cell or the connecting portion via a first gap and configured to support the first portion along a first direction when a first limit load acts on the hopper; and
a second support portion facing a second portion provided to the load cell or the connecting portion via a second gap and configured to support the second portion along a second direction intersecting the first direction while the first support portion supports the first portion when a second limit load larger than the first limit load acts on the hopper.

2. The weighing apparatus according to claim 1,
wherein the first direction is a vertical direction,
the second direction is a direction in which the one end of the load cell and the other end of the load cell face each other,
the first support portion is provided to a first extending portion configured to extend from the fixing portion to a side of the load cell, and
the second support portion is provided to a second extending portion configured to extend above the load cell from the fixing portion.

3. The weighing apparatus according to claim 2,
wherein the first portion is provided to the connecting portion to face the first support portion from above in the first direction, and
the second portion is provided to the connecting portion to face the second support portion from an opposite side from the hopper in the second direction.

4. A combination weighing apparatus comprising:
a plurality of weighing apparatuses according to claim 1;
a conveyance portion configured to convey the articles to the hopper; and
a controller configured to select a combination of weighing values so that a total value becomes a target weighing value based on weighing values of the articles output from the weighing apparatuses, and discharge the articles to the hopper corresponding to the combination.

* * * * *